March 10, 1970
W. T. EPPLER
3,500,185
ELECTRODE PROBE SYSTEM MONITORING DIAMETRICALLY OPPOSED
CONDUCTOR CABLE SECTIONS TO MEASURE SHEATH
THICKNESS AND ECCENTRICITY
Filed June 21, 1967
3 Sheets-Sheet 1
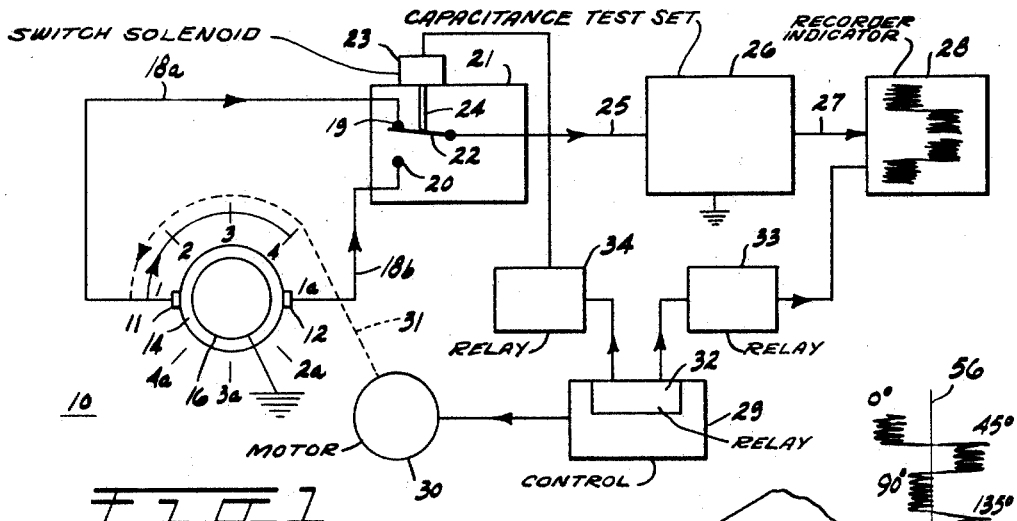
FIG-1
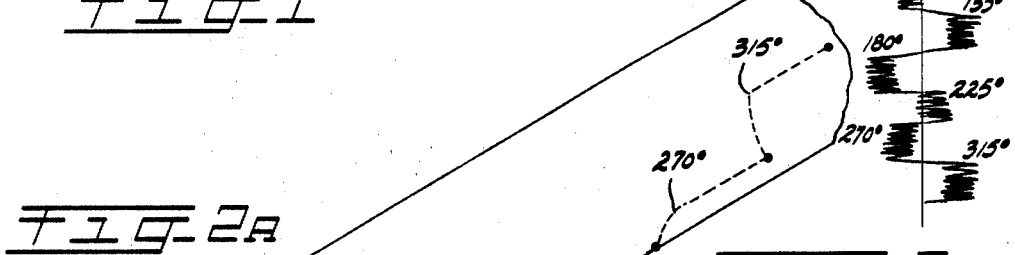
FIG-2A
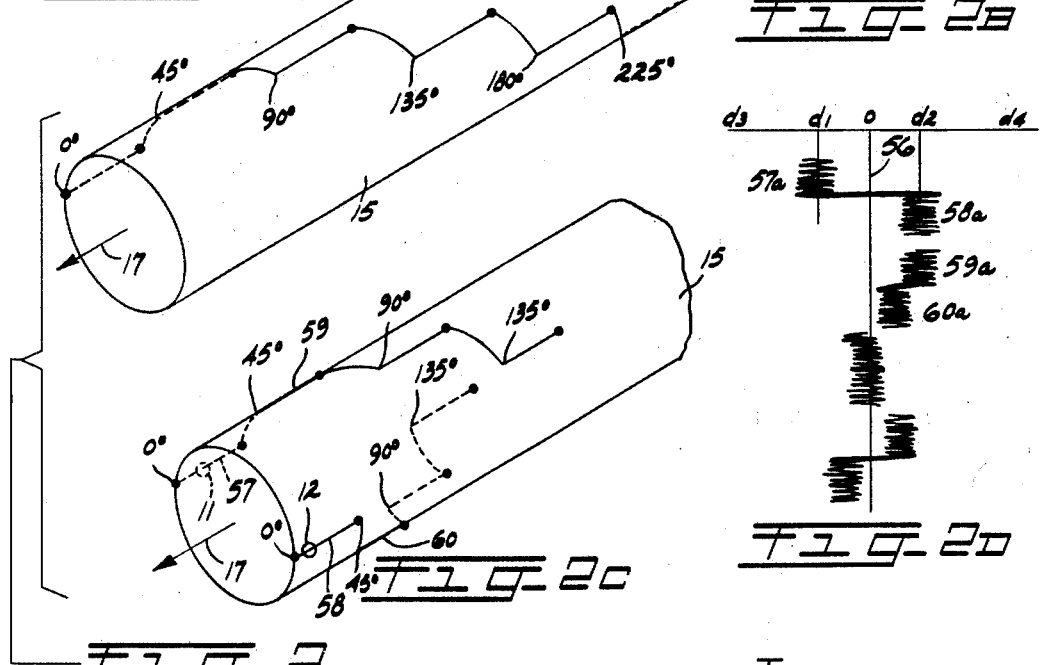
FIG-2B
FIG-2C
FIG-2D
FIG-2
INVENTOR
W. T. EPPLER
By Eugene S. Lovette
ATTORNEY

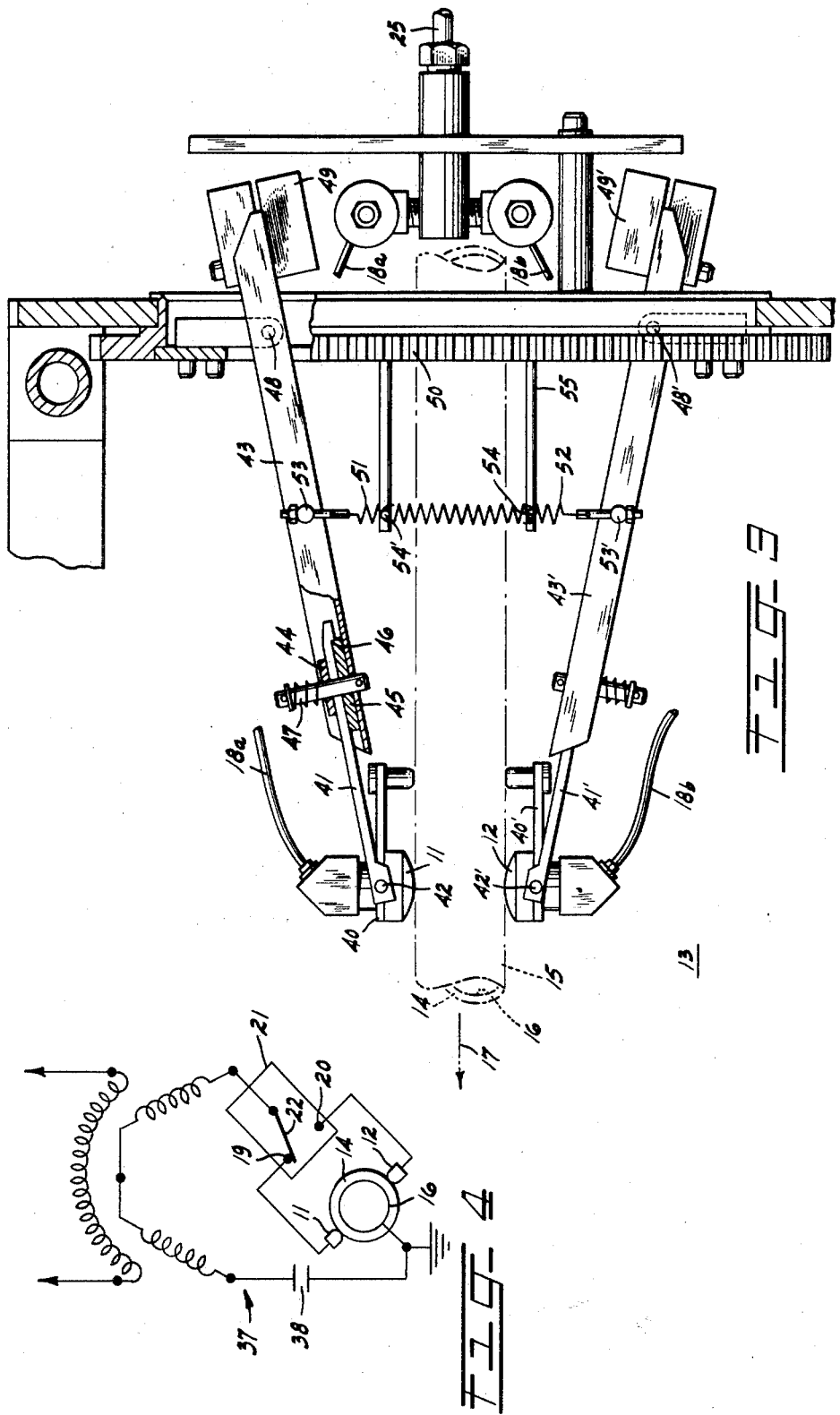

United States Patent Office

3,500,185
Patented Mar. 10, 1970

3,500,185
ELECTRODE PROBE SYSTEM MONITORING DIAMETRICALLY OPPOSED CONDUCTOR CABLE SECTIONS TO MEASURE SHEATH THICKNESS AND ECCENTRICITY
Walter Trowbridge Eppler, Cranford, N.J., assignor to Western Electric Company, Incorporated, New York, N.Y., a corporation of New York
Filed June 21, 1967, Ser. No. 647,745
Int. Cl. G01r 27/26
U.S. Cl. 324—61          4 Claims

ABSTRACT OF THE DISCLOSURE

An electrode probe system has a pair of electrode probes held in operative contact on advancing cable for monitoring the capacitance between the probes and a metal jacket underlying the insulator sheath on which the probes are positioned. The invention is characterized by a single indexing head supporting said pair of probes to contact diametrically opposite wall sections of the cable sheath. Each probe is alternately switched into and out of a capacitance bridge circuit, and the recorded measurements of the cable sheath provide more meaningful values of cable wall eccentricity and thickness.

BACKGROUND OF THE INVENTION

Field of the invention

This invention relates to an electrode probe system for measuring the thickness and eccentricity of the outer sheath of electrical cable and, in particular, the invention concerns a system wherein a pair of probes carried by a single indexing head are mounted to measure diametrically opposite wall sections of advancing cable to provide a more meaningful measurement of cable sheath eccentricity and wall thickness.

When the cable is bent either during field use or installation, structural stress and strain loads appear at diametrically opposite wall sections of the cable sheath in the region of the bend. The diametric wall sections in the bend region are essentially in the same cross sectional plane of the cable. Should one diametric side of the cable wall in a bend region be thinner than its opposite side, the thinner wall section will sustain a larger portion of the stress load imparted by the bend. When the structural load becomes excessive, rupture or damage to the cable follows which necessitates its replacement. The problem of unequal distribution of stress loads occurs even if the cable thickness for both sides of the sheath wall are thicker than a prescribed thickness of cable specification. It is therefore desirable that the cable have concentric diametric sheath dimensions, in addition to dimensions conforming to the prescribed design specifications, to avoid the stress problems introduced by eccentric cable walls. Concentric width dimensions contemplate equal diametric walls essentially in the same cross-sectional plane of the cable, in contrast to the comparison of two cable sides spaced longitudinally an appreciable distance apart along the cable axis.

During monitoring of sheath thickness, it is desirable that a recorded graph thereof present cable eccentricity and wall thickness in a manner which is immediately discernible upon glancing at the graph. This allows the attendant of the plastic extruder apparatus to adjust the apparatus to correct for eccentricity and wall thickness deviations from a prescribed value while applying the plastic sheath to the cable.

Description of the prior art

Reference may be made to U.S. Patent 2,721,975 issued to B. M. Wojciechowski on Oct. 25, 1955, and U.S. Patent 2,872,640 issued to W. T. Eppler on Feb. 3, 1959, for background information concerning the field in which the instant invention relates and for illustrations of prior art. The plastic sheath of electrical cable is normally monitored during fabrication by measuring the capacitance between an electrode probe and a metal jacket or grounded member underlying the plastic sheath.

Heretofore, in prior art, the cable was monitored during extruding its plastic sheath by a single probe mounted to spiral around the advancing cable. By the time such system monitored and recorded opposite wall sections of the cable, the cable traveled longitudinally an appreciable distance. The compared wall sections are spaced longitudinally apart along the cable, and thus are not truly diametric walls. Measurements thereof are not true representations of cable concentricity, that is to say, values of diametric wall sections essentially in the same cross-sectional plane of the cable. At most the measurements are merely representative values of opposite wall sections spaced apart some appreciable axial distance along the cable.

The aforesaid Patent 2,721,975 shows a system employing a pair of probes. One probe is balanced against the other in an impedance bridge. The system therein is not adequate with respect to the problems and objects of the instant invention.

SUMMARY OF THE INVENTION

The instant invention provides a meaningful measurement and a visual graph of eccentricity and wall thickness of the monitored cable. The graphed information apprises the attendant of cable eccentricity and wall thickness as the sheath is being extruded on the cable. The graph porvides reliable means for adjusting the extrusion while fabricating same, and this information is immediately discernible upon visual inspection without calibration or calculations by the attendant.

In accordance with the invention, a pair of similar electric probes are mounted on a single indexing head. The probes are spaced to contact operatively diametric wall sections of the advancing cable. The probes are alternately switched into and out of one arm of a capacitance test set bridge for measuring such wall sections. Another bridge arm consists of a reference-standard capacitor which represents the preset and desired sheath wall thickness against which the monitored value of capacitance is measured. The monitoring system is arranged to rotate the indexing head and the probes mounted thereon to four sensing positions about the cable axis. This arrangement requires a limited angular sweep of only 135° by head-probe assembly in order to cover circumferentially the entire cable about its axis. A pair of graphs corresponding to the alternate measurements are made for the octant position and represent measurements of diametrically opposite wall sections of the cable sheath. Should the thickness of the plastic extrusion vary in a longitudinal direction, the variation is very slow in rate of change. Consequently, longitudinally adjacent measurements of diametric wall sections are essentially as effective and reliable as diametric measurements in the same plane of the cable.

It is therefore the principal object of the invention to provide a monitoring system for providing a more meaningful measurement and indication of eccentricity and wall thickness of the extruded sheath of electrical cable.

It is an object of the invention to effect the aforesaid measurement by a single indexing head carrying a pair of probes mounted to contact operatively the diametrically opposite wall sections of an electric cable, and for alternately switching each probe into a capacitance measuring bridge for monitoring cable eccentricity and wall thickness.

As a further object of the invention, the system contemplated herein furnishes graphs which depict cable eccentricity, the amount thereof, and the value of cable wall thickness for the octant positions about the cable axis, whereby prompt adjustment to plastic extruder apparatus may be made while the cable is being covered by the sheath.

Further objects and advantages will become apparent from the following description of the invention taken in conjunction with the figures in which:

BRIEF DESCRIPTION OF THE DRAWING

FIG. 1 shows schematically a block diagram of an electrode probe system in accordance with the principles of the invention;

FIGS. 2a and 2b depict, respectively, a trace along cable circumference and its corresponding graphed signals in accordance with prior art practice of monitoring a cable sheath and is set forth herein for a better understanding of the instant invention; FIGS. 2c and 2d are corresponding illustrations for the system in accordance with the invention herein;

FIG. 3 is a fragmentary and side elevational view of an indexing head with two probes mounted thereon in accordance with the invention herein;

FIG. 4 is a fragmentary schematic view of a bridge circuit in accordance with the invention herein.

DETAILED DESCRIPTION

Figure 5:
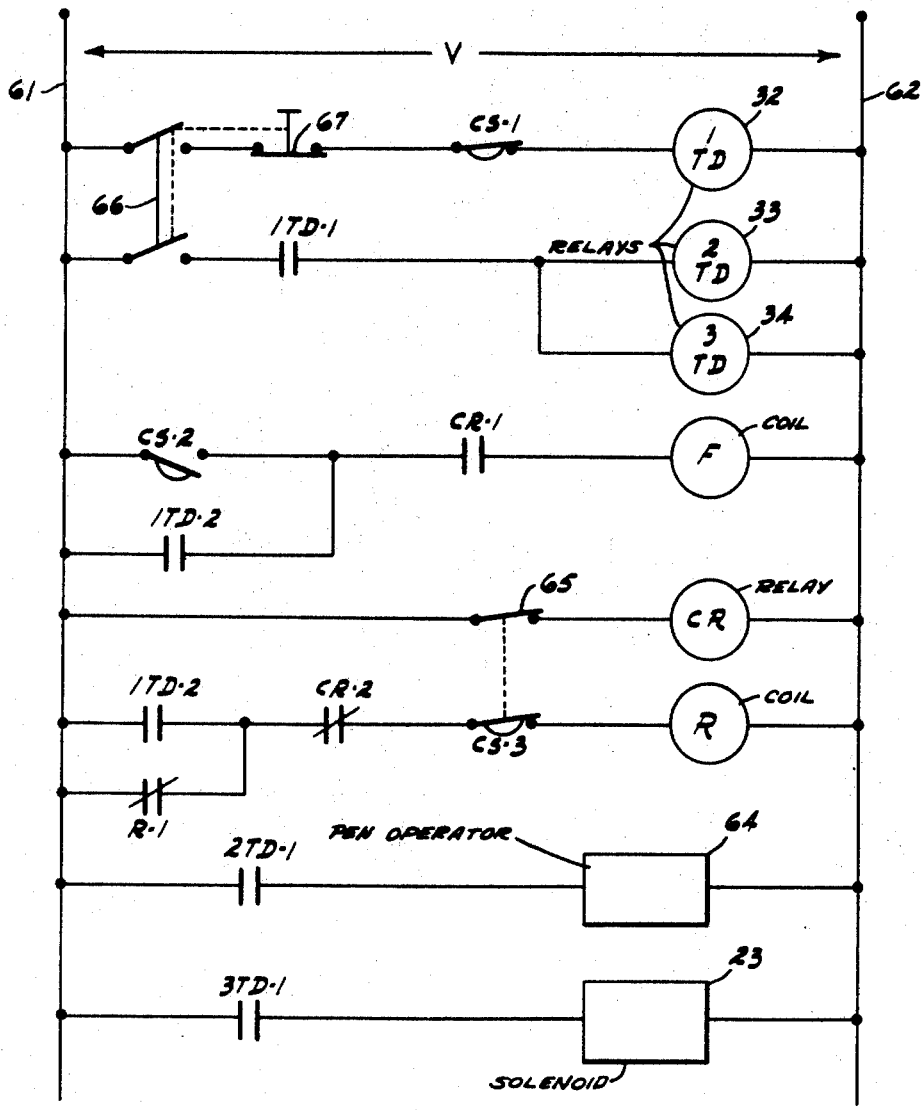
FIG. 5 is a schematic diagram illustrating an indexing control for regulating the system disclosed in FIG. 1.

Reference is now made to the figures for an embodiment of a system 10 in accordance with the invention. System 10 includes a pair of probes 11, 12 both mounted on a single probe supporting indexing head 13. Probes 11, 12 are mechanically and electrically identical, because each probe is alternately switched into a capacitance test set bridge for measuring and indicating the thickness and eccentricity of diametrically opposite wall sections of the outer sheath 14 of a cable 15. Sheath 14 overlies a circumferential metallic jacket 16. Jacket 16 is grounded during the capacitance bridge measurement of cable wall 14. The cable under test is advanced longitudinally along a given path as indicated by arrow 17.

Head 13 is turnable about the cable axis. Pursuant to the instant invention, head 13 supports both probes 11, 12 in juxtaposed relationship, whereby each probe makes continuous operative contact with diametrically opposite wall sections of cable sheath 14. Each probe has an individual coaxial output 18a, 18b connected to respective terminals 19, 20 of a coaxial switch 21. Switch 21 has a spring biased blade 22 normally making contact with terminal 19. When the switch solenoid 23 is energized, a switch plunger 24 is actuated to depress and hold blade 22 in contact with switch terminal 20. The output signal from switch 21 is connected by a line 25 to a corner junction of an impedance bridge 37, FIG. 4. Bridge 37 is part of a capacitance test set 26. The output from test set 26 is fed by a line 27 into a recorder type indicator 28, which depicts measured signals on a roll chart by a pen stylus. The combination of an impedance bridge test set and indicator device are well known in the art, for example, refer to U.S. Patent 2,721,975. The instant invention contemplates employing probes 11, 12 for alternate intervals of 10 seconds each as one arm of the test set bridge 37. A second bridge arm consists of a grounded reference capacitor 38 (FIG. 4) against which the exploring probe is compared. This arrangement provides a thickness measurement upon calibrating the reference capacitor 38 to represent a preset desired wall thickness. For the instant invention, the bridge circuit of FIG. 4 herein may be used with a discriminator circuit of the type shown in Patent 2,721,975.

System 10 also includes an index control circuit 29 for regulating operation of a reversible motor drive 30. Motor 30 is mechanically linked to head 13 as depicted by broken line 31 for turning head 13 about the cable axis. Each cycle of operation calls for indexing head 13 through discrete and sequential angular distances of 45°, clockwise in FIG. 1, for advancing head 13 from one measuring position on cable 15 to another. Head 13 is held at each measuring position for a period of 25 seconds while signals provided by probes 11, 12 are sequentially recorded by indicator 28. During the foregoing operations, cable 15 continues to advance at a preset rate of speed in the direction of arrow 17.

The period of a measuring cycle is preset for 25 seconds by a main time delay relay 32 in control 29. The measuring cycle is as follows with probes 11, 12 held at positions 1–1a (FIG. 1). At the start of the cycle, the pen stylus is raised from the indicator roll chart and remains in this inoperative status until lowered by a pen "on-off" time delay relay 33. Relay 33 is set to lower the pen stylus to graph the signal output from test set 26 five seconds after the start of the 25-second measuring period. The control circuit 29 is designed to maintain graph recording of the signals for the remaining 20 seconds of the 25-second period. During the first 10 seconds of the pen recording operation (5 seconds to 15 seconds from the start of the period) the indicator pen records signals sensed by probe 11. During the next 10 seconds, the indicator pen records signals sensed by probe 12.

Also at the start of the measuring period, switch blade 22 makes contact with terminal 19 and remains in such status until its solenoid 23 is energized by a switch transfer relay 34. Relay 34 is preset to energize solenoid 23 and transfer blade 22 to make and hold contact with terminal 20 at 15 seconds from the start of the 25-second interval. The switch transfer operation removes probe 11 from bridge 37 and inserts probe 12 into the bridge arm. Switch 21 is held energized by the control circuit 29 for the last 10 seconds of the 25-second period of the measuring cycle.

Upon the timed completion of 25 seconds, relay 32 de-energizes and returns to its zero status, which action simultaneously de-energizes relays 33, 34 causing the latter to drop out and return to zero status. Such action lifts the indicator pen to a raised "off" status and returns switch blade 22 to its normal make contact with terminal 19. The latter condition removes probe 12 from the bridge arm and reinserts probe 11 into the bridge arm for the next probe exploring cycle. Upon the three relays 32, 33, 34 dropping out, control circuit 29 conditions motor 30 to turn head 13 clockwise 45° thereby indexing probe 11 to its position 2 and probe 12 to its position 2a. After the probes, which move as unitary components of head 13, are locked in respective positions 2 and 2a, control circuit 29 is designed to energize relay 32 thereby starting its set 25 second operation from "zero" status to repeat the bridge-recorder measuring cycle as described hereinbefore.

The foregoing operation is repeated for two more probe octant positions, 3–3a and 4–4a. At the end of the last measurement and recording operation, for octant positions 4–4a, the three relays drop out as described hereinbefore. Thereafter, control 29 conditions motor 30 for reversed turning, whereby head 13 is rotated counterclockwise (FIG. 1) to return probes 11, 12 to their respective initial positions 1–1a. When the last condition is reached, the entire measuring and recording operation hereinbefore described is repeated. During the interval of time head 13 is returning to octant position 1–1a, the indicator pen stylus is raised to "off" status, and probe 11 has been inserted into test set bridge 37 because relays 33, 34 are in de-energized status.

FIG. 3 illustrates probes 11, 12 supported by the single head 13 in accordance with the invention. The probehead assembly is described with respect to probe 11, since both probes are essentially identical structurally and electrically. Probe 11 is mounted on a carriage frame 40. Carriage 40 is held by a yoke 41 pivoted at one end to opposite sides of the carriage frame 40. One pivot connection at 42 is shown in FIG. 3. Yoke 41 is supported by a pivotal member 43. The right end of yoke 41 extends through clamping blocks 44, 45 and latches at a ledge 46 over lower block 45. Blocks 44, 45 are held together by a pair of spring-biased bolts 47, one of which is shown in FIG. 3. The foregoing arrangement permits easy removal and attachment of a probe-yoke assembly with respect to a probe supporting head 13. Member 43 is pivoted at 48 to the frame of head 13 and also includes a counterbalancing weight 49. Counterweight 49 neutralizes gravitational effects on member 43 and the probe-carriage assembly carried thereby for the various indexed positions about the cable axis. Head 13 also includes rotatable gear ring 50 secured to the frame of head 13. Motor drive 30, not shown in FIG. 3, turns a drive gear (not shown) which engages gear ring 50 to turn same and thus the entire indexing head 13 and the probes 11, 12 carried thereby about the cable axis.

The oppositely mounted probe 12 is similarly supported by head frame 13. Components of the supporting assembly for probe 12 have primed reference numbers which correspond to like components of probe 11. Each probe is spring biased by individual springs 51, 52. Spring 51 has an upper end 53 tied to arm 43 and a lower end 54 tied to an extension 55 of head frame 13. Similarly, the two ends of spring 52 are tied at 53' and 54'. Springs 51, 52 supply forces for holding the respective probes 11, 12 in operative contact with the cable surface. Coaxial outputs 18a, 18b from each probe connect to individual coaxial input connections of switch 21. Switch 21 is mounted on a frame member of head 13. The switch output coaxial line 25 connects to a junction of the bridge test set.

FIG. 2a illustrates a trace of a single probe as it explores the surface of advancing cable in accordance with the prior art technique of measuring the cable sheath. FIG. 2b depicts the corresponding graphed signals and the sequence in which the signals are recorded. The center line 56 (FIG. 2b) depicts the desired wall thickness, and it is calibrated on the chart upon reference to standard capacitor 38. The amount of offset from center line 56 for a discrete group of graph signals is an indication of the amount the corresponding explored section of sheath is either thicker or thinner than the desired thickness, depending whether the recorded signal appears on one side or the other of center line 56.

The prior art arrangement requires that the probe supporting head index 315° about the cable axis to cover the eight octant positions at which the probe is stationed as it explores the cable sheath. The cable is usually advanced at a rate from 50 to 150 feet per minute. Heretofore, a probe was held at its measuring octant position for an interval of 30 seconds. Consequently, the adjacent ends of diametrically opposite cable sections explored by the single probe system were spaced longitudinally apart in the order of 100 feet to 300 feet along the cable circumference depending upon the selected cable speed. In FIG. 2b, every fifth graph of recorded signals corresponds to diametrically opposite sections of cable. The fact that these graphs correspond to sections of cable spaced 100 feet apart to as much as 300 feet apart demonstrates the disadvantage of the prior art technique and means for measuring cable eccentricity. As previously noted, meaningful measurements are those taken of diametrically opposite sections of the cable circumference in the same cross-sectional plane of the cable, or as actually practiced, with a minimum of longitudinal spacing therebetween.

FIG. 2c illustrates the trace made by the two probes 11, 12 in accordance with the instant invention. The first three-fifths of the dashed line 57 includes the recorded 10 seconds sensed by probe 11; its recording is depicted by graph 57a in FIG. 2d. Center line 56 again represents the calibrated chart ordinate representing the desired sheath thickness, and is preset system-wise by the reference capacitor 38. The latter two-fifths of the diametrically opposite line 58 in FIG. 2c represents the 10 seconds sensed by probe 12; its recording is depicted by graph 58a in FIG. 2d. Recorded graphs 57a and 58a depict cable measurements longitudinally next adjacent to each other along the cable axis, and thus provide a meaningful indication for evaluating both the cable sheath thickness and its eccentricity.

After probes 11, 12 are indexed to octant positions 2 and 2a, (FIG. 1) the first three-fifths of line 59 shown in FIG. 2c includes the recorded 10 seconds probe 11 senses the cable, and the latter two-fifths of line 60 represents the 10 seconds probe 12 senses the cable. The corresponding graphs in FIG. 2d are depicted by 59a and 60a. The remaining traces on cable 15 and the graphs corresponding thereto in FIG. 2d depict the operation for octants 3–3a and 4–4a.

Assuming the chart is calibrated along the horizontal coordinate for thickness values, center line 56 depicts the preset desired thickness value. Graphs on one side of line 56 represent dimensions of sheath wall thicker than the calibrated preset value corresponding to line 56 and those on the other side of line 56 represent thinner dimensions of the sheath wall. For example, the horizontal chart coordinate in FIG. 2d, depicts section 57 as having a value of $d_1$, and section 58 of a value of $d_2$. The distance between the center lines through the individual sets of graphs for each octant position depicts the amount of eccentricity for the diametrically opposite portions of the cable sheath. The diametrical thickness measurement can readily be identified on the recorder chart as the pairs of connected graphs. The indicator pen stylus is inoperative when the probes are indexing between octant positions. Hence signals for different octant positions are not connected on the graph chart.

The second set of graphs 59a–60a depict diametric wall measurements substantially equal in width and characterized by substantially zero eccentricity. The next set of measurements represent octants 3–3a and depict diametrical wall sections without eccentricity and a width substantially equal to the preset width. It will be understood that the graph chart may be calibrated in any manner to facilitate instantaneous visual evalution of the status of the cable upon mere glance of the chart. The chart may include markers $d_3$ and $d_4$ at the opposite extremes indicating a sheath thickness, for example, too thin and too thick. Such markers provide a visual signal calling for adjustment to the extruder applying the plastic sheath to the cable.

In comparison to the prior art, a complete eight octant measurement is secured by the practice of the instant invention for cable length of approximately 85 feet when cable moves at its low rate of 50 feet per minute and over a length of 250 feet when the cable moves at a rate of 150 feet per minute. Furthermore, probe leads such as lines 18a, 18b wind only 135° about the cable axis to accommodate indexing of head 13 in comparison to the requirement of a 315° wind-up of a probe lead for indexing a head carrying a single probe in accordance with the prior art practice. This advantage imparts less strain on the probe leads 18a, 18b and prolongs the life of same.

FIG. 5 illustrates a circuit for regulating the operation of motor 30 and relays 32, 33 and 34. It will be appreciated by persons skilled in the art that many different circuit arrangements and types of circuit mean may be employed to achieve the described sequential operation for system 10. As an example, mechanical or electrical steppers may be employed in lieu of the relay and the cam-switch circuit set forth in FIG. 5. The selected circuit is merely a matter of design choice. Relays 32, 33 and 34 are also identified as 1TD, 2TD, and 3TD. The circuit is designed to energize relays 32, 33, 34 by a power source V across lines 61, 62. Relay 32 has timed contacts 1TD–1, 1TD–2, and relays 33, 34 have respective timed contacts 2TD–1 and 3TD–1.

Contact 2TD–1 is in series with a pen operator 64, which when energized, holds the indicator pen stylus in down condition for recording signals on the rolled chart. Contact 3TD–1 is in series with solenoid 23 for energizing same when contact 3TD–1 closes.

The circuit also includes cam switches CS–1, CS–2 and CS–3. A cam, not shown, is keyed to the shaft of motor 30 to turn therewith. Switch CS–1 is in series with relay 32, and is held closed by the motor cam except during index turning of motor 30 at which time contact CS–1 is held in open status. Switch CS–2 is in series with the forward turning (clockwise direction in FIG. 1) coil F of motor 30 and is held closed by the motor cam during the interval of motor index turning; at all other times, switch CS–2 is held open by the cam operator. Switch CS–3 is in series with the reverse turning (the counter-clockwise direction in (FIG. 1) coil R of motor 30 and is held closed by the motor cam operator during the interval from the time probes 11, 12 are in octant positions 4–4a and until said probes return to octant positions 1–1a. Switch CS–3 is ganged to a switch 65 in series with a relay coil CR. Switch 65 is closed when switch CS–3 is closed. Relay CR has contact CR–1 in series with forward motor coil F, and contact CR–2 in series with reverse motor coil R. Contact CR–1 is biased to remain closed when its relay CR is not energized, and is normally open when its relay CR is energized. Contact CR–2 is held closely only when its relay CR is energized.

It will be assumed that power is disconnected and probes 11, 12 are in positions 1–1a. This conditions a two-pole switch 66 in open status. Switch 66 is ganged to a spring return start button 67. When button 67 is depressed, switch 66 is closed. Release of button 67 returns its contacts to closed status, but switch blades 66 remain closed until manually opened. This action energizes relay 32 through switch 66, button 67 and cam switch CS–1, and starts the timed interval of 25 seconds from zero. Contact 1TD–1 closes and remains in such condition for the 25 seconds, and timed relays 33, 34 energize. At 5 seconds after zero, contact 2TD–1 closes to start pen recording; and 15 seconds after zero, contact 3TD–1 closes to transfer operation from probe 11 to probe 12.

At the end of 25 seconds, relay 32 opens its contacts 1TD–1 to drop relays 33, 34; whereupon contacts 2TD–1 and 3TD–1 open. At the end of 25 seconds, relay 32 also closes its normally open pair of contacts 1TD–2. This energizes motor coil F through closed contact CR–1 to index probes 11–12 to positions 2–2a. Coil R is not energized because contact CR–2 and switch CS–3 are both open. Upon forward turning of motor drive 30, switch CS–1 opens and switch CS–2 closes. The former de-energizes relay 32 which now resets to zero and opens its two contacts 1TD–2. Power continues to motor coil F through closed CS–2 and CR–1. When the probes arrive at positions 2–2a, CS–1 closes and CS–2 opens, thus stopping motor index turning. Relay 32 is energized through closed CS–1 to start the 25-second cycle again which energizes relays 33, 34 through contact 1TD–1, which contact closes when relay 32 is energized.

The above described measuring cycle repeats for probe positions 2–2a, 3–3a, and also for positions 4–4a except at the latter, the following variation in operation takes place to prepare the system for reverse turning of motor drive 30.

When probes 11, 12 arrive at positions 4–4a, cam switch CS–3 is closed by the cam operator which closes switch 65 and energizes relay CR whereupon its contacts CR–1 are now opened and CR–2 are now closed. The operation of relays 32, 33, 34 continues as described hereinbefore for the 25-second timed interval of operation. At the conclusion thereof, contacts 1TD–2 close thus energizing reverse motor coil R through the closed CR–2 and CS–3. Upon reverse turning of motor 30, CS–1 is driven open which de-energizes relay 32 and opens its contacts 1TD–2. However, upon reverse turning of the motor, a contact R–1 previously opened for all conditions described hereinbefore now closes and remains closed during the time motor 30 turns in its reverse direction. Contact R–1 bridges contact 1TD–2 to maintain coil R energized for the reverse turning interval. When the probes are returned to positions 1–1a, switches CS–3 and 65 open to stop motor turning. Cam switch CS–1 closes to energize relay 32 which starts the 25-second cycle to repeat again. Relay CR de-energizes when its switch 65 opens, contact CR–1 returns to closed status by reason of spring bias and contact CR–2 opens.

It is intended that all matter contained in the above description and shown in the accompanying figures shall be interpreted as illustrative and not in any limiting sense.

What is claimed is:

1. A system for measuring the thickness and eccentricity of a sheath of an elongated article comprising:
   a pair of probes,
   supporting means for holding said probes in operative contact with said sheath at diametrically opposed portions of said sheath,
   means for indexing said probes through angular distances about the axis of said elongated article so that said operative contacts can be made at different diametrically opposed portions,
   measuring means said article and measuring means connected to a point of reference potential,
   switching means for connecting alternately said first and second probes to said measuring means to measure the thickness of said sheath at said portions, and
   display means for displaying said thickness measurements from said diametrically opposed portions and for comparing said thickness measurements from said diametrically opposed portions to measure the eccentricity of said sheath.

2. A system for measuring the thickness and eccentricity of an outer insulating sheath of electrical cable or like elongated article moving longitudinally, comprising:
   first and second probes;
   supporting means for holding said probes in operative contact with said insulating sheath at diametrically opposed portions of said sheath;
   indexing means for moving said probes through predetermined angular distances about the axis of said cable, such that the positions of operative contact with said insulating sheath remain diametrically opposed;
   measuring means said cable and measuring means connected to a point of reference potential;
   switching means for connecting alternately said first and second probes to said measuring means to measure the thickness of said insulator sheath at said portions;
   control means for actuating said switching means and said indexing means so that said probes are successively connected to said measuring means at least once for each index position; and
   display means for displaying said thickness measurements from said diametrically opposed portions and for comparing said thickness measurements from said diametrically opposed portions to measure the eccentricity of said sheath.

3. A system according to claim 2 wherein:
   said display means comprises a graphic recorder which displays thickness deviations from a nominal value as a graphic line deviating correspondingly from a standard value line; and
   said control means actuates said display means so that said graphic line representing the thickness at diametrically opposed portions of said cable for each particular index position are compared to measure the amount of eccentricity.

4. A system according to claim 2 wherein:
   said display means displays said thickness measurements from said diametrically opposed portions in a side by side relationship so that thickness and eccentricity of said sheath is measured.

References Cited

UNITED STATES PATENTS

| | | | |
|---|---|---|---|
| 2,177,528 | 10/1939 | Kidd | 324—54 X |
| 2,417,062 | 3/1947 | Coake | 33—174 |
| 2,721,975 | 10/1955 | Wojciechowski | 324—61 |
| 2,872,640 | 2/1959 | Eppler | 324—61 |
| 2,898,550 | 8/1959 | Fischer | 324—61 |
| 3,330,159 | 7/1967 | Ongaro | 324—61 X |

EDWARD E. KUBASIEWICZ, Primary Examiner

J. M. HANLEY, Assistant Examiner

L-566-PT
(6-69)

UNITED STATES PATENT OFFICE
CERTIFICATE OF CORRECTION

Patent No. 3,500,185      Dated March 10, 1970

Inventor(s) Walter T. Eppler

It is certified that error appears in the above-identified patent and that said Letters Patent are hereby corrected as shown below:

Column 2, line 24, "imepdance" should be --impedance--.

Column 5, line 39, "correspinding" should be --corresponding--.

Column 6, line 66, "mean" should be --means--.

Column 7, line 17, "(FIG. 1)" should be --FIG. 1)--;

line 27, "closely" should be --closed--.

Claim 1, line 27, after "means" (first occurrence) insert a comma --,--.

Claim 2, line 49, after "means" (first occurrence) insert a comma --,--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents